(12) United States Patent
Choi et al.

(10) Patent No.: US 7,139,063 B2
(45) Date of Patent: Nov. 21, 2006

(54) FABRICATING METHOD FOR LIQUID CRYSTAL PANEL IMPLEMENTING FERROELECTRIC LIQUID CRYSTAL AND OPERATING IN A MONOSTABLE STATE

(75) Inventors: Suk-Won Choi, Anyang-shi (KR); Su-Seok Choi, Hanam-shi (KR)

(73) Assignee: LG. Philips Lcd Co., Ltd., Seoul (KR)

( * ) Notice: Subject to any disclaimer, the term of this patent is extended or adjusted under 35 U.S.C. 154(b) by 0 days.

(21) Appl. No.: 09/749,440

(22) Filed: Dec. 28, 2000

(65) Prior Publication Data

US 2001/0019393 A1    Sep. 6, 2001

(30) Foreign Application Priority Data

Dec. 29, 1999    (KR) ............................... 1999-65039

(51) Int. Cl.
    *G02F 1/141*    (2006.01)
(52) U.S. Cl. ................... 349/188; 349/100; 349/172
(58) Field of Classification Search ............... 349/188, 349/34, 133, 184, 171, 172, 174, 100, 175, 349/185
    See application file for complete search history.

(56) References Cited

U.S. PATENT DOCUMENTS 5,200,848 A  *  4/1993  Hanyu et al. ............... 359/100
5,214,523 A  *  5/1993  Nito et al. .................. 359/100
5,583,682 A  * 12/1996  Kitayama et al. ........... 349/172
6,151,096 A  * 11/2000  McDonnell et al. ......... 349/188

FOREIGN PATENT DOCUMENTS

JP    09-311354    2/1997
KR    1996-0029879    8/1996

OTHER PUBLICATIONS

Y. Asao, T. Togano, M. Terada, T. Moriyama, S. Nakamura, J. Iba, "Novel Ferroelectric Liquid Crystal Mode for Active Matrix Liquid Crystal Display Using Cholesteric-Chiral Smeetic C. Phase Transition Material," Jpn. J. Appl. Phys. vol. 38 (1999), pp. 5977-5982.
T. Takahashi, T. Umeda, H. Furue, S. Kobayashi, "Modeling and Computer Simulation of the Electrooptic Response of Polymer-Stabilized Ferroelectric Liquid Crystal Cells," Jpn. J. Appl. Phys. vol. 38 (1999), pp. 5991-5995.
T. Furukawa, M. Shigeta, H. Uchida, M. Koden, "TFT-FLC with High Quality Moving Picture and High Contrast Ratio," IDW '00, pp. 251-254.
Office Action issued by the Korea Patent Office on Jul. 15, 2005.

* cited by examiner

*Primary Examiner*—Dung T. Nguyen
*Assistant Examiner*—Thoi V. Duong
(74) *Attorney, Agent, or Firm*—McKenna Long & Aldridge LLP (57) ABSTRACT

In the preferred embodiment of the present invention, a ferroelectric LC layer is formed between first and second substrates of a LC panel. The LC panel is cooled at a low temperature, for example at −20° C., where the ferroelectric LC maintains a smetic phase. Due to the cooling, molecules are uniformly aligned for their early alignment state.

31 Claims, 6 Drawing Sheets

*(related art)*

FABRICATING METHOD FOR LIQUID CRYSTAL PANEL IMPLEMENTING FERROELECTRIC LIQUID CRYSTAL AND OPERATING IN A MONOSTABLE STATE

This application claims the benefit of Korean Patent Application No. 1999-65039, filed on Dec. 29, 1999, which is hereby incorporated by reference for all purposes as if fully set forth herein.

BACKGROUND OF THE INVENTION

1. Field of the Invention

The present invention relates to a liquid crystal panel for a liquid crystal display (LCD) device, and more particularly, to a liquid crystal panel that implements a ferroelectric liquid crystal.

2. Discussion of the Related Art

LCD devices have characteristics of low power consumption and light weight and are widely used for a word processor, a personal computer, and a navigator system and the like.

Conventional LCD devices include display panels. Such display panels have upper and lower substrates that are attached with each other, and a liquid crystal (LC), such as a nematic, a smetic, or a cholesteric liquid crystal, interposed there between. Such display panels are operationally divided into a plurality of liquid crystal cells. On exterior surfaces of the upper and lower substrates, polarizers or retardation films are selectively attached. The liquid crystal display devices use an electro-optic effect of the liquid crystal.

A major consideration in the design of liquid crystal cells is the characteristics of the particular liquid crystal that is used. A good liquid crystal should have a fast response time, a good gray scale, a wide viewing angle, and low driving voltages. A nematic LC, a smetic LC, and a cholesteric LC are conventionally used for the LCD devices.

Among the various types of TN liquid crystal display, 90° twisted TN mode could satisfy neither wide viewing angle nor fast response time. An in-plane switching (IPS) mode has the wide viewing angle, but the response time thereof is too slow. The slow response time of the LCD results in decrease of the luminance and motion picture. To overcome the problem of the slow response time, various technologies are proposed. For the fast response time, LTN (low twisted nematic) and OCB (optically compensated birefringence) modes are studied. However, these technologies could not provide such a fast response time as CRT's in spite of further adopting a film compensation method.

The ferroelectric LC including anti-ferroelectric LC, surface stabilized ferroelectric (SSF) LC and a deformed helix anti-ferroelectric (DHF) LC becomes of interest due to their great optical properties. The ferroelectric LC basically has a chiral smetic C (SmC*) structure and shows a very fast response time of below 1m/sec.

Conventionally, in each molecular layer of the SmC* structure, or the liquid crystal in the SmC* phase, the longitudinal axes of the molecules tilt with respect to the layer normal. When a first electric field is applied to the ferroelectric LC in the SmC* phase, dipole moments of the molecules rotate in a definite direction according to the direction of the first electric field such that the molecules have a uniform alignment direction. Once aligned, the ferroelectric molecules maintain their alignment direction after the electric field is stopped.

In addition, when a second electric field having an opposite direction to that of the first electric field is applied to the once aligned ferroelectric LC molecules in the SmC* phase, the molecules quickly rotate to have a different alignment direction. This means that the molecular alignment of the ferroelectric LC depends on the direction of the electric field. Due to a spontaneous polarization of itself, the ferroelectric LC has a fast response time.

Figure 1:
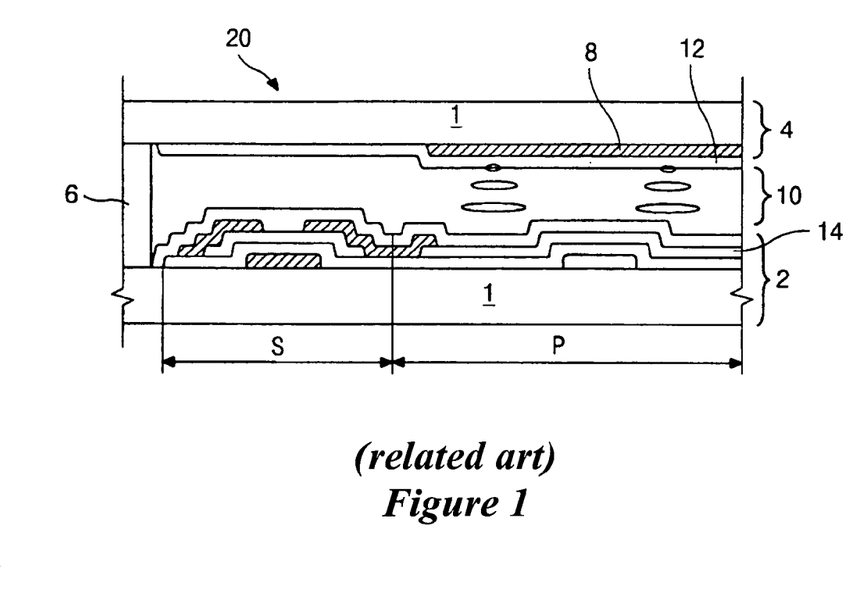
FIG. 1 is a cross-sectional view of a conventional TFT liquid crystal display panel.

FIG. 1 is a cross-sectional view illustrating a conventional LCD panel. As shown in FIG. 1, the LC panel has lower and upper substrates 2 and 4 with a LC layer 10 interposed between the lower and upper substrates 2 and 4. The lower substrate 2 has the TFT "S" as a switching element to change an orientation of the LC molecules and includes a pixel electrode 14 to apply a voltage to the LC layer 10 according to signals of the TFT "S". The upper substrate 4 has a color filter 8 of implementing colors and a common electrode 12 on the color filter 8. The common electrode 12 serves as an electrode for applying a voltage to the LC layer 10. The pixel electrode 14 is arranged over a pixel portion "P", i.e., a display area. Further, to prevent leakage of the LC injected into a space between the two substrates 2 and 4, the two substrates 2 and 4 are sealed by a sealant 6.

Figure 2:
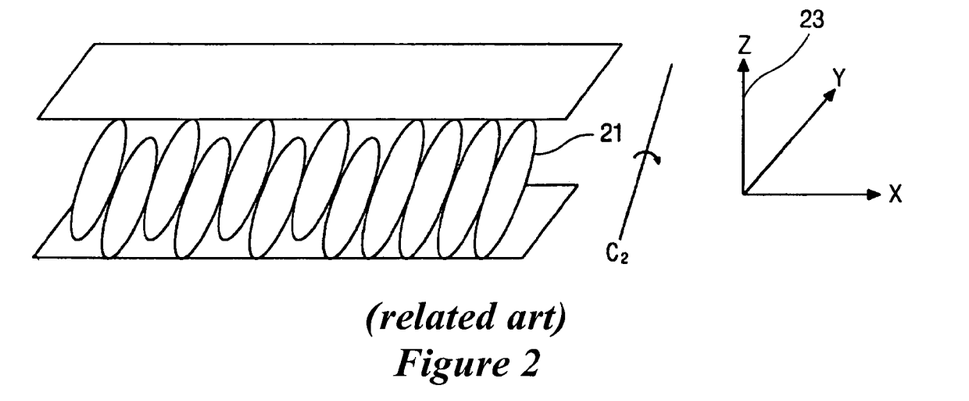
FIG. 2 illustrates an early alignment state of liquid crystal molecules in a SmC* phase.

FIG. 2 shows a cross-section of the SmC* structure that is aligned at its early state. As shown, each molecule is tilted with respect a normal line 23 normal to the layer.

Figure 3:
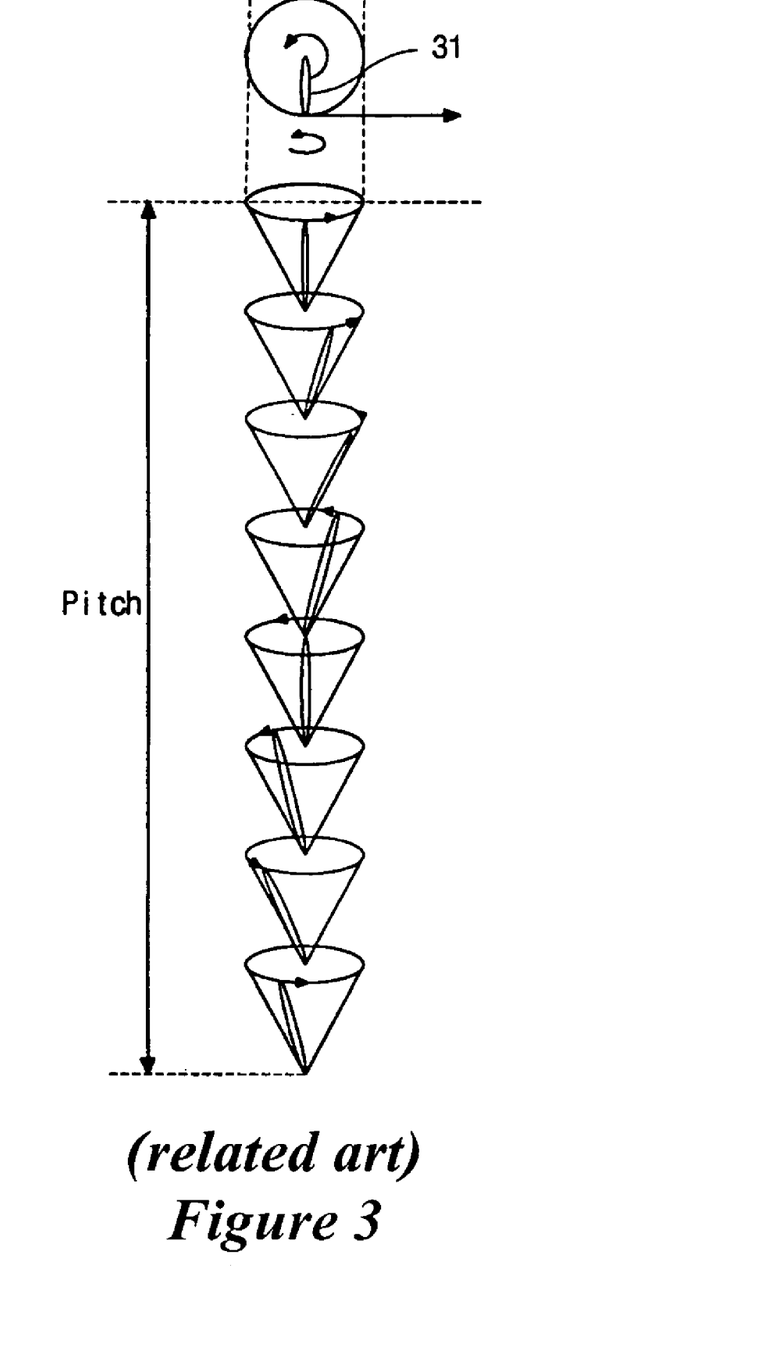
FIG. 3 is a perspective view illustrating a layer structure of ferroelectric LC molecules in the SmC* phase.

FIG. 3 shows a molecular alignment of the ferroelectric LC. As shown, longitudinal axes of the molecules 31 gradually rotate to form a helical structure. In forming the SmC* phase, a chiral group exists in the molecules, and the molecules form the helical structure to achieve a thermodynamic stability.

However, in the helical structure, since each dipole moment in the molecules also is rotating along the helical axis, a net dipole moment of the ferroelectric LC becomes zero. Therefore, a macroscopic spontaneous polarization throughout the molecules does not appear.

When an electric field is applied to the molecules aligned stably as shown in FIG. 1, each dipole moment is directed in the direction of the electric field such that each LC molecule is aligned again in one orientation. Further, when the electric field changes its direction, each LC molecule rotates to have an opposite tilt angle such that the LC serves as a switching for light.

That is to say, with first and second polarizers respectively having perpendicular transmittance axes and formed on exterior surface of the upper and lower substrates, when one of the transmittance axes corresponds to a first tilt angle of the molecules, a black state is achieved. On the contrary, when the molecules rotates to have a second tilt angle, a white state is achieved.

In the white state, the transmittance of the above-mentioned ferroelectric LC is calculated from a relation 1 of $T = \sin^2 4\Theta \sin^2 (\pi \Delta n d/\lambda)$, where "$\Theta$" is the first or second tilt a of the LC molecules, "d" is a thickness of the LC layer, and "$\lambda$" is a wavelength of an incident light.

Figure 4:
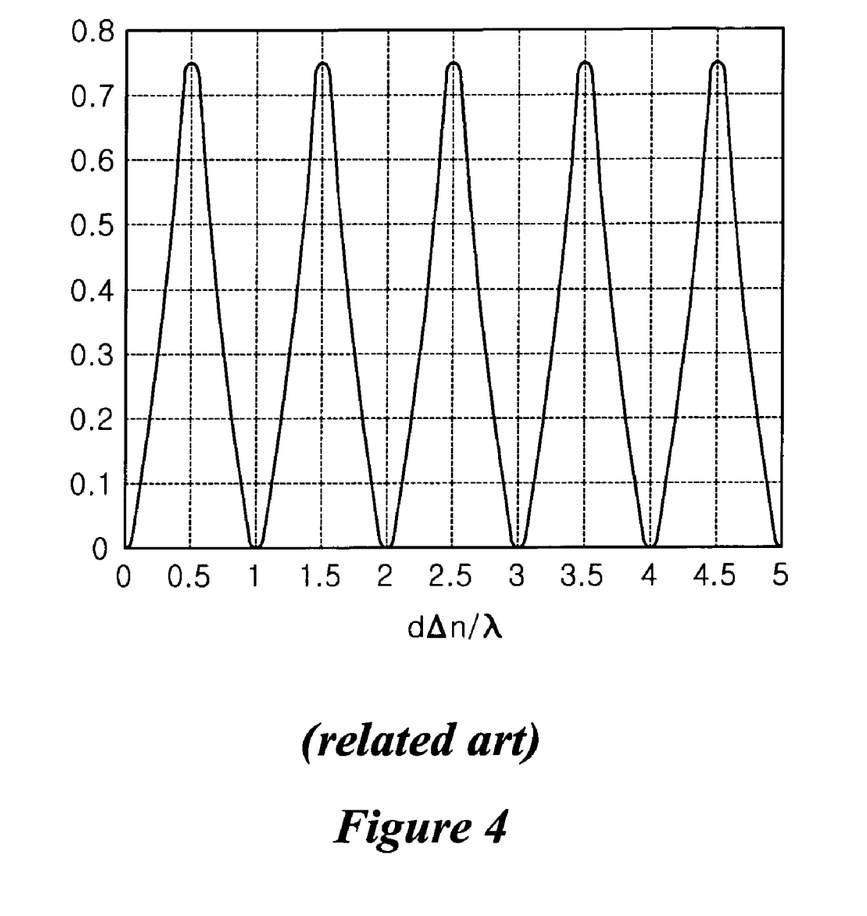
FIG. 4 is a graph illustrating a relation between a transmittance of the ferroelectric LC and a wavelength of an incident light.

As shown in FIG. 4, when the thickness d is between 1.5 and 2, the transmittance has the highest value. Therefore, in fabricating the LCD device implementing the ferroelectric LC, the LC layer thickness is conventionally designed to be 2 μm.

The ferroelectric LC has a better viewing angle than the TN-LC. That is to say, in case of the TN-LC, since refraction index rapidly changes between "on" state and "off" state, a gray scale inversion occurs and the viewing angle is narrow. However, in case of the ferroelectric LC, when the molecule rotates, one end of the molecule is fixed while the other end rotates on a plane parallel with the substrate such that the viewing angle of the ferroelectric LC is much wider than that of the TN-LC.

However, in case of the ferroelectric LC, due to the complicated structure, a contrast ratio declines, and the spontaneous polarization of the ferroelectric LC and the orientation films mutually affect each other such that afterimages are produced.

To compensate the above-mentioned disadvantage of the ferroelectric LC, the anti-ferroelectric LC is developed. Now, with reference to FIGS. 5A and 5B, an alignment structure of the anti-ferroelectric LC will be explained.

Figure 5A:
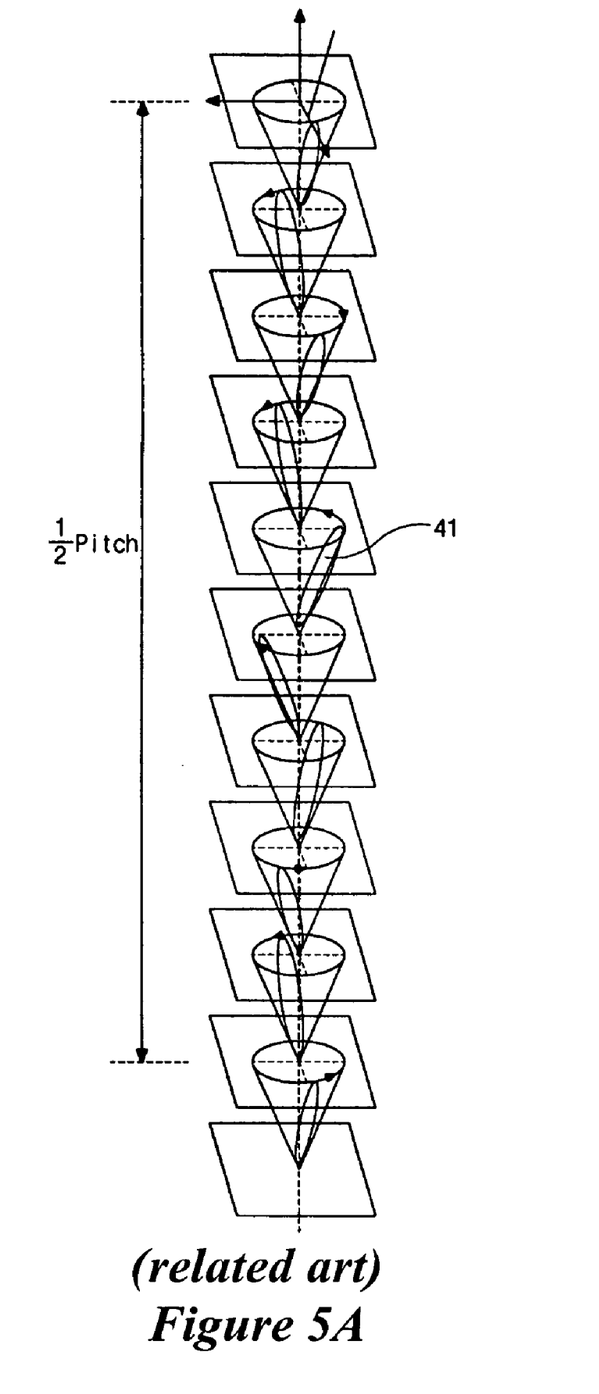
FIG. 5A is a perspective view illustrating a half pitch set of anti-ferroelectric LC molecules.

As shown in FIG. 5A, the anti-ferroelectric LC 41 conventionally has the helical structure similar to the SmC* structure of the ferroelectric LC shown in FIG. 3.

Figure 5B:
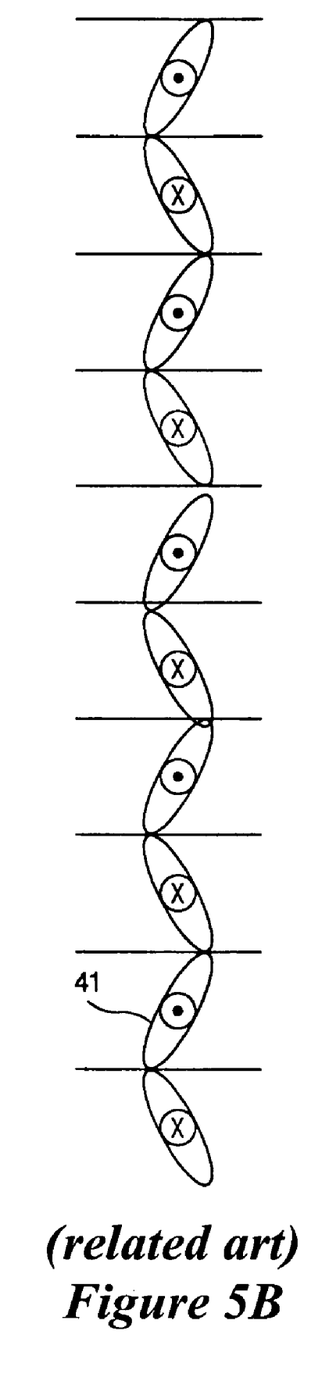
FIG. 5B is a projection view of FIG. 5A.

However, as shown in FIG. 5B, if the helical structure is discounted, the molecules alternately tilt in different directions and each molecule contacts an adjacent molecule such that the net dipole moment becomes zero.

Returning to FIG. 5A, if the molecules are selected from the helical structure in an alternate order, they form the same structure as what is shown in FIG. 3. In other words, a main helical structure of the anti-ferroelectric LC includes first and second helical sub-structures that have a phase difference of 180 degrees from each other and have the same helical structure as shown in FIG. 3.

At the early alignment state when the electric field is not applied and the molecules are the most stable, a main transmittance axis of the anti-ferroelectric LC is normal to the layer such that only a normal light to the layer travels through the layer.

However, when the electric field is applied over a threshold voltage, all the dipole moments are directed to the direction of the electric field such that the layer has a spontaneous polarization. Namely, the molecules tilt to the first or second tilt angle with respect to a line normal to the layer. At this point, if one transmittance axis of the first and second perpendicular transmittance axes in the first and second polarizers is formed corresponding to the normal line normal to the layer, the white state is achieved.

At the same configuration, if the electric field is stopped, the spontaneous polarization disappears and the black state is achieved, in other words, there are three operation modes used for switching light in the anti-ferroelectric LC. When the tilt angle is 45 degrees, the contrast ratio reaches its maximum for the anti-ferroelectric LC though it varies according to the arrangement of the polarizers.

The ferroelectric LC should satisfy the following conditions:

First, the smetic phase and non-zero angle between the molecules and the normal line normal to the layer;

Second, the molecules including a unsymmetrical carbon but not a racemic body; and Third, non-zero dipole moment normal to longitudinal axes of the molecules.

A DOBAMBC (2-methylbutyl p-[p(decyloxybenzylidene)-amino]-cinnamate) is the typical anti-ferroelectric LC. As the temperature falls down, the DOBAMBC changes its phase from smetic A to SmC*. With the phase transition temperature of the above-mentioned phase transition being a Curie transition temperature, the DOBAMBC obtains the ferroelectric property at a low temperature below the phase transition temperature of the SmC* phase.

Further, most of the ferroelectric LCs including the DOBAMBC has the unsymmetrical carbon such that the longitudinal axes of the molecules gradually rotate to a definite angle layer by layer to form the helical structure, with the tilt angle of the molecules fixed.

When the ferroelectric LC having the above-mentioned characteristics is adopted for a normally black mode, there occur a lot of actual problems such as a declination of the contrast ratio because the early alignment state of the ferroelectric LC is poor.

To improve the early alignment state of the ferroelectric LC, a lot of methods have been proposed. For example, an electric field such as an alternate electric field is conventionally applied to the molecules during the early alignment state, around the phase transition temperature of the SmC* phase. However, those methods still have troubles in the black state of the liquid crystal display.

SUMMARY OF THE INVENTION

Accordingly, the principles of the present invention relate to liquid crystal display devices that are designed to substantially obviate one or more of the problems due to the limitations and disadvantages of the related art.

It is an object of the present invention to provide a liquid crystal display device having a high contrast ratio.

Additional features and advantages of the invention will be set forth in the description that follows, and in part will be apparent from the description, or may be learned by practice of the invention. The objectives and other advantages of the invention will be realized and attained by the structure particularly pointed out in the written description and claims hereof as well as the appended drawings.

The present invention provides a method of fabricating a liquid crystal display device including the steps of forming a liquid crystal panel including first and second substrates; forming a ferroelectric liquid crystal layer between the first and second substrates; and cooling the liquid crystal panel to a temperature of a smetic phase of the ferroelectric liquid crystal.

It is to be understood that both the foregoing general description and the following detailed description are exemplary and explanatory and are intended to provide further explanation of the invention as claimed.

BRIEF DESCRIPTION OF THE DRAWING

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF AN ILLUSTRATED EMBODIMENT

Reference will now be made in detail to an embodiment of the present invention, the example of which is illustrated in the accompanying drawings.

In the preferred embodiment of the present invention, a ferroelectric LC is cooled at a low temperature to stabilize an early alignment state thereof.

In detail, at first, upper and lower substrates are attached to have a gap of below 2 μm inclusive. Thereafter, a chiral smetic C phase LC or other phases LC adjacent thereto is injected between the upper and lower substrates, and molecules of the LC are oriented using a proper method. Next, at a temperature range of the chiral smetic C phase or a chiral smetic $C_A$ phase, the molecules are cooled.

Specifically, four different ferroelectric LCs are respectively injected into four cells that have a cell gap of 2 μm inclusive, and each ferroelectric LC is cooled at the lower temperature of −20° C. where the ferroelectric LC still maintains the smetic phase. At this point, the four ferroelectric LCs have a characteristic of maintaining the smetic phase at the low temperature.

After the cooling is finished, the ferroelectric LCs are heated to a room temperature. Table 1 shows an optical property variance between before and after cooling:

TABLE 1

| Spec. | CONTRAST RATIO | |
|---|---|---|
| | Before Cooling | After Cooling |
| A | 130 | 465 |
| B | 130 | 420 |
| C | 40 | 70 |
| D | 60 | 300 |

As shown, after the cooling, the contrast ratio of the ferroelectric LC molecules in the smetic phase is improved. That is, as the temperature falls down, the LC becomes similar to a solid phase and an alignment order of the molecules becomes strong. Due to the strong alignment order, molecules are stably aligned and the contrast ratio is improved.

Now, with reference to FIG. 6, an early alignment state of the ferroelectric LC will be explained.

Figure 6:
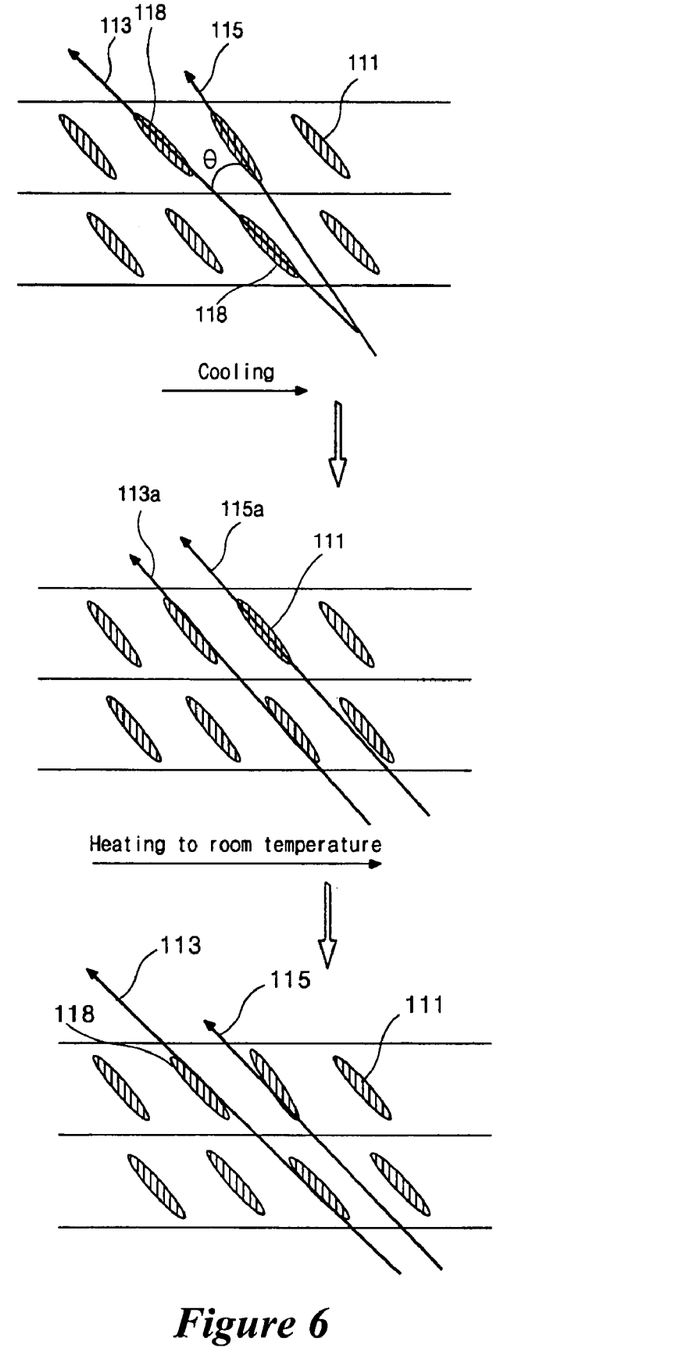
FIG. 6 illustrates a variance of an alignment of the ferroelectric LC molecules according to a temperature.

FIG. 6 is a cross-sectional view illustrating the alignment the ferroelectric LC. As shown, a plurality of LC molecules 111 are aligned to have an ideal alignment order. At the room temperature, the LC molecules 111 have a thermal motion of themselves and an interaction with each other. According to their thermal motion and interaction, each of the LC molecules takes a relative position in a layer.

At this point, a minority of the LC molecules 118 has more disorder due to the interaction such that a first oblique line 113 that connects longitudinal axes of the minority of disordered molecules 118 makes an angle of "Θ" with respect to a second oblique line 115 that connects longitudinal axes of the ordered molecules. When the LC molecules are cooled, the thermal motion of the molecules is decreased. As the thermal motion decreases, the LC molecules are aligned more stably such that the angle Θ between the first and second oblique lines 113 and 115 is declined. Namely, more molecules are aligned stably to be almost parallel with one another.

Further, when the cooled molecules are heated again to the room temperature, the thermal motion of the molecules increases again. However, since the molecules are already aligned stably such that the interaction among the molecules affects the thermal motion of the molecules, a rapid increase of the thermal motion is prevented, which means that the early alignment state is stable.

The improvement of the alignment according to the cooling, which increases the contrast ratio, results from following reasons.

First, the ferroelectric LC molecules have the decreased thermal motion at a temperature range of the smetic phase, according as the temperature falls down. Since the already aligned molecules interact with the disordered ones and guide them to be aligned, more molecules becomes aligned in a wanted direction. Namely, if a first number of the aligned molecules before the cooling is N, a second number of the aligned molecules after the cooling is N+α. If one molecule is assumed to have the interaction energy of "e", a total of the interaction energy is increased from eN to e(N+α) after the cooling.

The above-mentioned result of the cooling is similar to a mono-stable alignment by an electric field. When an electric field is applied to the molecules, an electromagnetic force acts to the molecules and more molecules become aligned to be mono-stable. Accordingly, a uniform alignment of the ferroelectric LC is achieved and a black state property of the ferroelectric LC is improved because of the uniform alignment.

As previously explained, once the molecules are cooled to have the uniform alignment, though the molecules are heated again to the room temperature, the increase of the thermal motion in the molecules are constrained due to the interaction that is increased by the cooling.

In other words, the interaction of the aligned molecules is increased by the cooling and prevents the thermal motion of the molecules in the room temperature such that the disorder of the molecules is constrained in spite of the room temperature. Accordingly, stability and alignment of the ferroelectric LC molecules are improved.

The present invention can be applied to a TFT (thin film transistor), a poly-Si, a MIM (metal-insulator-metal), or a diode.

While the invention has been particularly shown and described with reference to the preferred embodiments thereof, it will be understood by those skilled in the art that the foregoing and other changes in form and de tails may be made therein without departing from the spirit and scope of the invention. Thus, it is intended that the present invention covers the modifications and variations of this invention provided they come within the scope of the appended claims and their equivalents.

What is claimed is:

1. A method of fabricating a liquid crystal display device, comprising:
   forming a liquid crystal panel including first and second substrates;
   forming a ferroelectric liquid crystal layer between the first and second substrates of the liquid crystal panel;
   cooling the liquid crystal panel to a predetermined temperature so as to produce monostable alignment within the ferroelectric liquid crystal;
   heating the cooled liquid crystal panel substantially to room temperature; and
   operating the liquid crystal display device in a monostable state.

2. The method of claim 1, wherein the predetermined temperature is in a range around −−20° C.

3. The method of claim 1, wherein the ferroelectric liquid crystal layer includes an anti-ferroelectric liquid crystal layer.

4. The method of claim 1, wherein the cooling produces a chiral smectic C phase in the ferroelectric liquid crystal.

5. The method of claim 1, wherein the cooling produces a chiral smectic $C_A$ phase in the ferroelectric liquid crystal.

6. The method of claim 1, wherein the first substrate includes a transparent material.

7. The method of claim 1, further comprising a step of forming a pixel electrode on the first substrate.

8. The method of claim 1, further comprising a step of forming a thin film transistor on the first substrate.

9. The method of claim 1, further comprising a step of forming a color filter on the second substrate.

10. The method of claim 1, wherein the predetermined temperature is below a smectic phase temperature.

11. The method of claim 1, wherein the ferro electric liquid crystal layer includes 2-methylbutyl p-[p(decyloxybenzylidene)-amino]-cinnamate (DOBAMBC).

12. A method of fabricating a liquid crystal display device, comprising:
    forming a liquid crystal panel having a first substrate and a second substrate;
    interposing a ferroelectric liquid crystal layer comprised of liquid crystal molecules, between the first substrate and the second substrate;
    cooling the liquid crystal layer to a predetermined temperature to form a monostable alignment of the liquid crystal molecules;
    heating the cooled liquid crystal layer substantially to room temperature; and
    operating the liquid crystal display device in a monostable state.

13. A method of fabricating a liquid crystal display device according to claim 12, wherein the predetermined temperature is below a smectic phase temperature.

14. A method of fabricating a liquid crystal display device according to claim 13, wherein the liquid crystal layer is subsequently heated above the smectic phase temperature.

15. A method of fabricating a liquid crystal display device according to claim 12, wherein the predetermined temperature is about −20° C.

16. A method of fabricating a liquid crystal display device according to claim 12, wherein the ferro electric liquid crystal layer includes an anti-ferroelectric liquid crystal layer.

17. A method of fabricating a liquid crystal display device according to claim 12, wherein the cooling produces a chiral smectic C phase in the ferroelectric liquid crystal layer.

18. A method of fabricating a liquid crystal display device according to claim 12, wherein the cooling produces a chiral smectic $C_A$ phase in the ferro electric liquid crystal layer.

19. A method of fabricating a liquid crystal display device according to claim 12, wherein the ferroelectric liquid crystal layer includes 2-methylbutyl p-[[p(decyloxybenzylidene)-amino]-cinnamate (DOBAMBC).

20. A method of improving the contrast ratio of a liquid crystal display device, comprising:
    forming a liquid crystal panel having a first substrate, a second substrate, and an interposed ferroelectric liquid crystal layer that is comprised of liquid crystal molecules;
    cooling the liquid crystal layer to a predetermined temperature to form a monostable alignment of the liquid crystal molecules;
    heating the cooled liquid crystal layer substantially to room temperature;
    operating the liquid crystal display device in a monostable state; and
    passing light through said liquid crystal panel.

21. A method of improving the contrast ratio of a liquid crystal display device according to claim 20, wherein the predetermined temperature is below a smectic phase temperature.

22. A method of improving the contrast ratio of a liquid crystal display device according to claim 21, wherein the liquid crystal layer is subsequently heated above the smectic phase temperature.

23. A method of improving the contrast ratio of a liquid crystal display device according to claim 20, wherein the ferroelectric liquid crystal layer includes 2-methylbutyl p-[p (decyloxybenzylidene)-amino]-cinnamate (DOBAMBC).

24. A method of fabricating a liquid crystal display device, comprising:
    forming a liquid crystal panel including first and second substrates;
    forming a ferroelectric liquid crystal layer between the first and second substrates of the liquid crystal panel;
    cooling the liquid crystal panel to a predetermined temperature so as to produce monostable alignment within the ferroelectric liquid crystal; and
    heating the cooled liquid crystal panel substantially to room temperature;
    wherein the predetermined temperature is in a range around −20° C.

25. The method of claim 24, wherein the ferroelectric liquid crystal layer includes an anti-ferroelectric liquid crystal layer.

26. The method of claim 24, wherein the cooling produces a chiral smectic C phase in the ferroelectric liquid crystal.

27. The method of claim 24, wherein the cooling produces a chiral smectic $C_A$ phase in the ferroelectric liquid crystal.

28. The method of claim 24, wherein the first substrate includes a transparent material.

29. The method of claim 24, further comprising a step of forming a pixel electrode on the first substrate.

30. The method of claim 24, further comprising a step of forming a thin film transistor on the first substrate.

31. The method of claim 24, further comprising a step of forming a color filter on the second substrate.

* * * * *